(12) United States Patent
Taylor et al.

(10) Patent No.: US 6,518,549 B1
(45) Date of Patent: Feb. 11, 2003

(54) MODULAR RADIANT HEATER UNITS FOR USE IN GRILLS HAVING EDGE HEAT WEIGHTING

(76) Inventors: Christopher R. Taylor, 150 Countryside Way, Columbus, MS (US) 39702; Simon P. Griffiths, 10 Archers Wood, Hampton Hargate Peterborough PE7 8AW (GB); Philip Wayne Hunnicutt, 13481 Country Rd. 49, Winfield, AL (US) 35594; Byron Neal Cantrell, 33735 Country Rd. 49, Beaverton, AL (US) 35544

( * ) Notice: Subject to any disclaimer, the term of this patent is extended or adjusted under 35 U.S.C. 154(b) by 0 days.

(21) Appl. No.: 09/710,324

(22) Filed: Nov. 9, 2000

Related U.S. Application Data

(63) Continuation-in-part of application No. 09/075,960, filed on May 11, 1998, now Pat. No. 6,194,689, which is a continuation of application No. 09/075,960, filed on May 11, 1998.

(51) Int. Cl.⁷ ................................................. H05B 3/68
(52) U.S. Cl. ................................ 219/450.1; 219/460.1
(58) Field of Search .......................... 219/443.1, 445.1, 219/446.1, 448.1, 448.12, 448.14, 448.18, 450.1, 451.1, 452.11, 452.12, 460.1, 461.1, 462.1–464.1; 99/374, 377, 378; D7/407, 408, 402

(56) References Cited

U.S. PATENT DOCUMENTS

| | | | |
|---|---|---|---|
| 1,711,472 A | 4/1929 | Lewin | 219/450.1 |
| 3,398,264 A | 8/1968 | Katzman et al. | 219/454 |
| 3,646,321 A | 2/1972 | Siegla | 219/464 |
| 3,742,179 A | 6/1973 | Harnden, Jr. | 219/10.77 |
| 3,833,793 A * | 9/1974 | McWilliams et al. | 219/461.1 |
| 3,866,018 A | 2/1975 | Hurko | 219/460 |
| 4,034,206 A | 7/1977 | Penrod | 219/464 |
| 4,321,857 A | 3/1982 | Best | 99/340 |
| 4,347,432 A * | 8/1982 | Gossler | 219/448.19 |
| 4,414,465 A | 11/1983 | Newton et al. | 219/449 |
| 4,471,214 A | 9/1984 | Gossler et al. | 219/464 |
| 4,527,538 A | 7/1985 | Caferro | 126/21 R |
| 4,619,190 A | 10/1986 | Smith | 99/393 |
| 4,788,414 A | 11/1988 | Schreder | 219/464 |
| 4,789,773 A * | 12/1988 | Mikschl | 219/461.1 |
| 4,862,795 A | 9/1989 | Hawkins | 99/446 |
| 5,094,155 A | 3/1992 | Long | 99/386 |
| 5,094,221 A | 3/1992 | Ho | 126/4 |
| 5,190,027 A | 3/1993 | Miceli | 126/41 R |
| RE34,671 E | 7/1994 | Long | 99/386 |
| 5,397,873 A | 3/1995 | Stoops et al. | 219/450 |
| 5,566,607 A | 10/1996 | Schleimer | 99/446 |
| 5,676,049 A | 10/1997 | Arnold | 99/401 |
| D395,198 S * | 6/1998 | Wania | D7/407 |
| 5,877,475 A | 3/1999 | Hecht et al. | 219/449 |

* cited by examiner

*Primary Examiner*—Sang Paik

(57) ABSTRACT

The present invention provides a modular heating unit for a grill. The grill has a grill plate supported on a support base. The grill plate has a bottom surface and a top surface. The modular heating unit is mounted to the bottom surface of the grill plate and has at least four side edges. The modular heating unit has a pan, an insulation layer and a heating element. The pan has a generally flat base and a circumferential sidewall. The insulation layer has an insulation base and a circumferential sidewall. The heating element is supported on the insulation base to heat the grill plate and is positioned in a spaced apart relationship to the bottom surface of the grill plate. The modular heating unit is divided into a center section and two side sections. The side sections are adjacent to two side edges of the modular heating unit. The heating element is contoured to provide more heat to at least one of the side sections than the center section of the heating unit. This allows for additional heat to be provided to certain sections of the grill plate that may extend beyond the modular heating unit.

20 Claims, 10 Drawing Sheets

MODULAR RADIANT HEATER UNITS FOR USE IN GRILLS HAVING EDGE HEAT WEIGHTING

The present application is a continuation-in-part application and claims priority from application Ser. No. 09/075,960 entitled "Radiant Heater Element For Use in Grill and the Like" filed Feb. 28, 2000 (U.S. Pat. No. 6,194,689) which is a continuation of application Ser. No. 09/075,960 entitled "Radiant Heater Element For Use in Grill and the Like" filed May 11, 1998.

This patent application is related to application Ser. No. 09/710,563 entitled "Modular Radiant Heater Units for Use in Grills and the Like" by Taylor et al., filed concurrently herewith, the disclosure of which is incorporated herein by reference in its entirety.

FIELD OF THE INVENTION

The present invention relates generally to grills used in commercial establishments and domestically, and more particularly, to modular heating units that may be replaced for such grills and modular heating units that have edge heat weighting.

BACKGROUND OF THE INVENTION

Cooking grills used in high volume food outlets generally comprise a top plate having an upper surface to cook food. As shown in FIG. 1, a tubular heating unit 12 is installed beneath a grill plate 10. In actuality, and as shown in FIG. 2, a series of tubular heating units are installed in a side-by-side configuration on the underside of plate 10. The heating units are mounted between the top plate and a bottom plate 14. A layer 16 of a wool-type insulation material is held in place on the underside of plate 14 by yet a third plate 18. This entire assembly is held together by a plurality of spaced bolts 20 which are sufficiently long so to extend through all of the plates. Fasteners 22 are then used to complete the assembly.

There are a number of problems with this construction. First is the efficiency of the grill to cook food. For example, in high volume cooking, it is expected that the grill will heat a frozen hamburger patty in approximately 35 seconds from the time the patty is placed on the grill. When the grill is at temperature, this will occur. However, when the grill is first turned on, the grill takes excessive time to reach an adequate temperature to cook the patty. Second, the temperature profile across the heating area of the grill is non-uniform. In the area adjacent the location of tubular heating elements there is a hot spot. Between adjacent sections of the heating element, there is a substantial fall off in temperature. As a result, food placed on a portion of the grill over a heating element cooks faster than food placed on other parts of the grill.

In addition to the effects on cooking, if a heating element fails, there is a substantial amount of downtime required in order to replace the failed unit. The grill must be disassembled, the unit replaced, and then the grill reassembled before being used again for cooking. If this can be done during normal maintenance periods, there may be little or no impact on food service. If, however, replacement must be made during normal business hours, service will be greatly impaired.

To overcome one or more of the problems set forth above, the co-pending, commonly assigned, application Ser. No. 09/710,563 entitled "Modular Radiant Heater Units for Use in Grills and the Like" by Taylor et al., discloses modular radiant heater units for grills. As described in that application, there may be situations where it is desirable to modify the layout of the heater element to provide alternative heat distributions. For example, there may be sections of a grill plate that extend beyond the modular heater unit and exposed to the ambient environment. This may cause certain sections to be slightly lower in temperature than other sections. To increase the cooking surface of such a grill plate, the present invention is directed to a heater element layout that compensates for outer edge sections of the grill plate that may extend beyond the radiant heater unit.

SUMMARY OF THE INVENTION

To that end, the present invention includes a modular heating unit for a grill. The grill has a grill plate supported on a support base. The grill plate has a bottom surface and a top surface. The modular heating unit is mounted to the bottom surface of the grill plate and has at least four side edges. The modular heating unit has a pan, an insulation layer and a heating element. The pan has a generally flat base and a circumferential sidewall. The insulation layer has an insulation base and a circumferential sidewall. The heating element is supported on the insulation base to heat the grill plate and is positioned in a spaced apart relationship to the bottom surface of the grill plate. The modular heating unit is divided into a center section and two side sections. The side sections are adjacent to two side edges of the modular heating unit. The heating element is contoured to provide more heat to at least one of the side sections than the center section of the heating unit.

The modular heating unit may further include a shielding block and a temperature sensor. The shielding block is positioned between the bottom surface of the grill plate and a top surface of the insulation base. The temperature sensor extends through a hole in the flat base of the pan and a hole in the shielding block. The temperature sensor is used to measure the temperature of the grill plate.

The modular heating unit may also be rectangular. In such an embodiment, the side sections of the modular heating unit that have added heat are adjacent to the two shorter edges of the modular heating unit.

In another embodiment, the present invention includes a grill that has a grill plate and a plurality of modular heating units. The grill plate has a top surface to cook food and a bottom surface. The plurality of modular heating units are mounted to the bottom surface of the grill plate and each modular heating unit has a plurality of side edges. Each modular heating unit has a pan, an insulation layer and a heating element. The modular heating unit is divided into a center section and two side sections. The two side sections are adjacent to at least two of the side edges of the heating unit. The heating element is contoured to provide more heat to at least one of the two side sections than the center section.

The above summary of the present invention is not intended to represent each embodiment, or every aspect of the present invention. This is the purpose of the figures and detailed description that follows.

BRIEF DESCRIPTION OF THE DRAWINGS

Other objects and advantages of the invention will become apparent upon reading the following detailed description and upon reference to the drawings.

Figure 1:
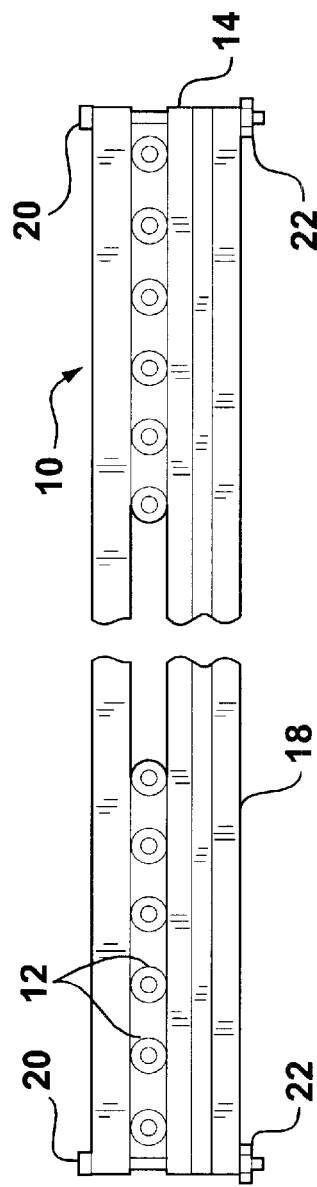
FIG. 1 is a side elevation view of a conventional, prior art grill assembly.
Figure 2:
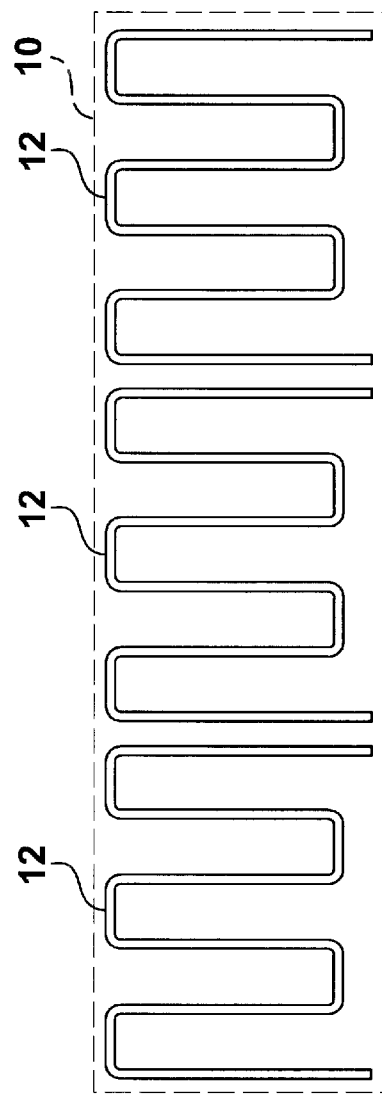
FIG. 2 is a plan view of a prior art tubular heating element assembly used with the grill.

While the invention is susceptible to various modifications and alternative forms, certain specific embodiments thereof have been shown by way of example in the drawings and will be described in detail. It should be understood, however, that the intention is not to limit the invention to the particular forms described. On the contrary, the intention is to cover all modifications, equivalents, and alternatives falling within the spirit and scope of the invention as defined by the appended claims.

DESCRIPTION OF ILLUSTRATIVE EMBODIMENTS

Figure 3:
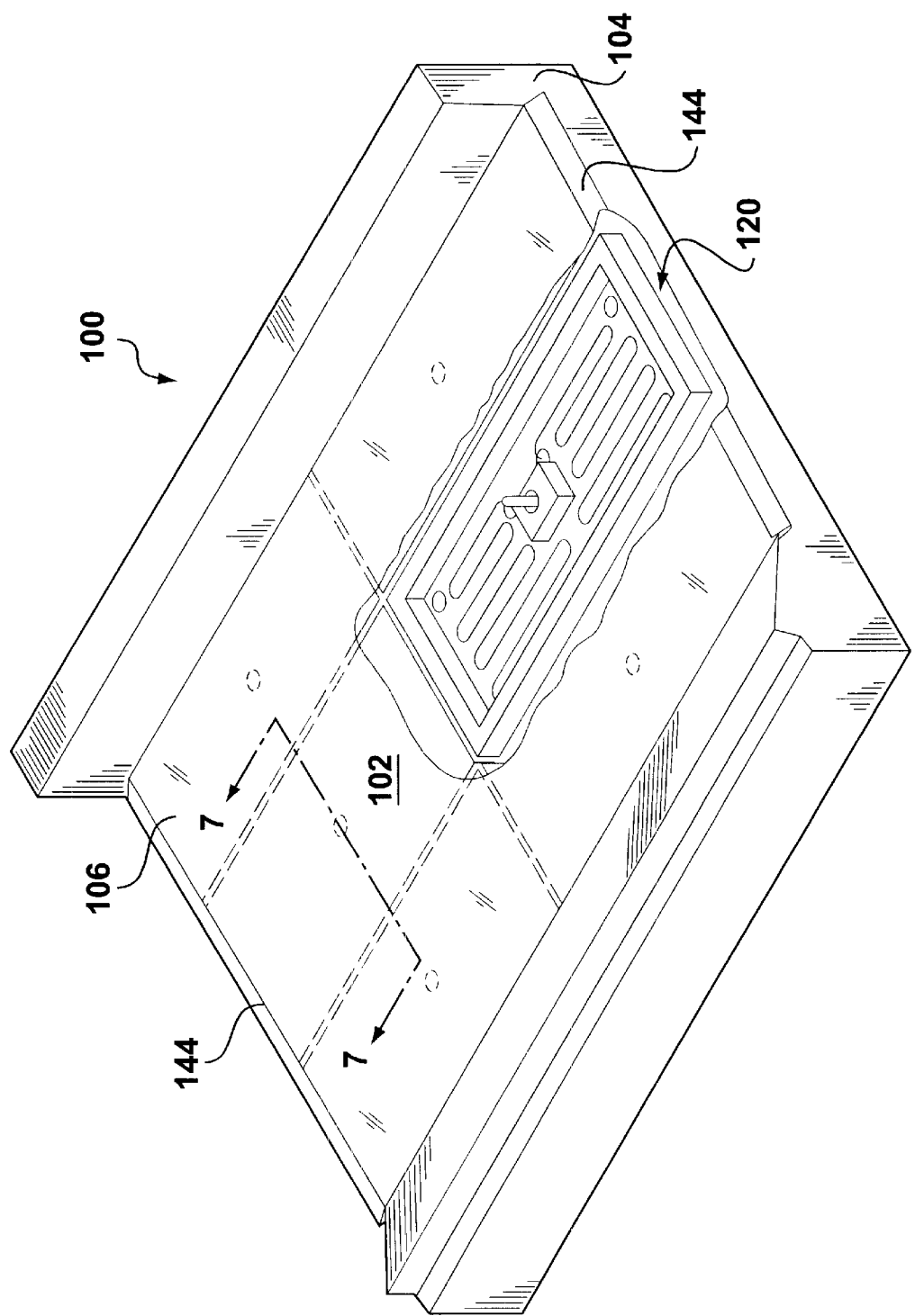
FIG. 3 is a perspective view of the top of a grill containing modular heating units of the present invention.

Illustrative embodiments will now be described with reference to the accompanying figures. Turning to the drawings, FIG. 3 depicts one embodiment of a grill 100 of the present invention. The grill 100 includes a grill plate 102 and a support base 104. The grill plate 102 has a top surface 106, a bottom surface 108 and outer side edges 144. The top surface 106 serves as a cooking surface for food to be cooked. The grill plate 102 is preferably made of aluminum, steel, or cast iron but other suitable metals may be used.

Figure 4:
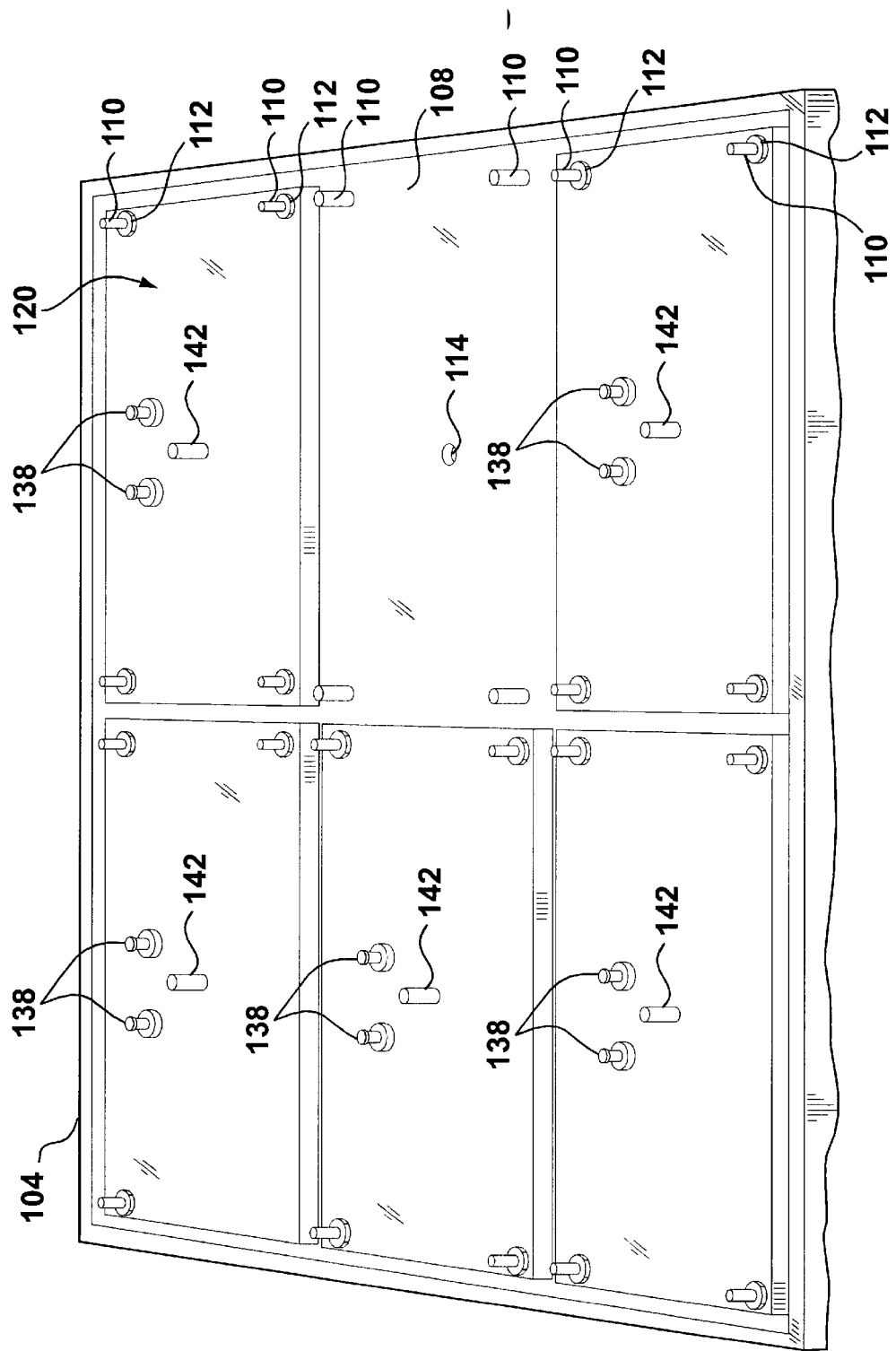
FIG. 4 is a perspective view of the bottom of a grill containing modular heating units of the present invention.

FIG. 4 shows a plurality of heating units 120 installed on the bottom surface 108 of the grill plate 102. In one embodiment, six heating units 120 are installed on the bottom surface 108. The present invention is not limited to this number and it is contemplated that a variety of configurations could be used with a larger or smaller number of heating units 120. To illustrate the bottom surface 108 of the grill plate 102, FIG. 4 only shows five installed heating units 120. During normal operation, however, six heating units 120 would be installed in the embodiment shown in FIGS. 3 and 4.

The heating units 120 are used to heat the grill plate 102 so that the cooking surface 106 is a desired temperature. In one embodiment, the bottom surface 108 of the grill plate 102 has a plurality of bolts 110 that extend through each heating unit 120. In this embodiment, the plurality of bolts 110 pass through holes 116 in the heating unit 120 and fasteners 112 are used to retain the heating unit 120 against the bottom surface 108 of the grill plate 102. This design allows a heating unit 120 to be easily removed if there is a failure in the heating unit 120.

For each heating unit 120, the bottom surface 108 of the grill plate 102 has a bore 114. Preferably, the bore 114 does not extend completely through the grill plate 102. The bore 114 is used to measure the temperature of the grill plate 102. As will be explained in greater detail below, a temperature sensor mounted to the heating unit 120 extends into bore 114.

Figure 5:
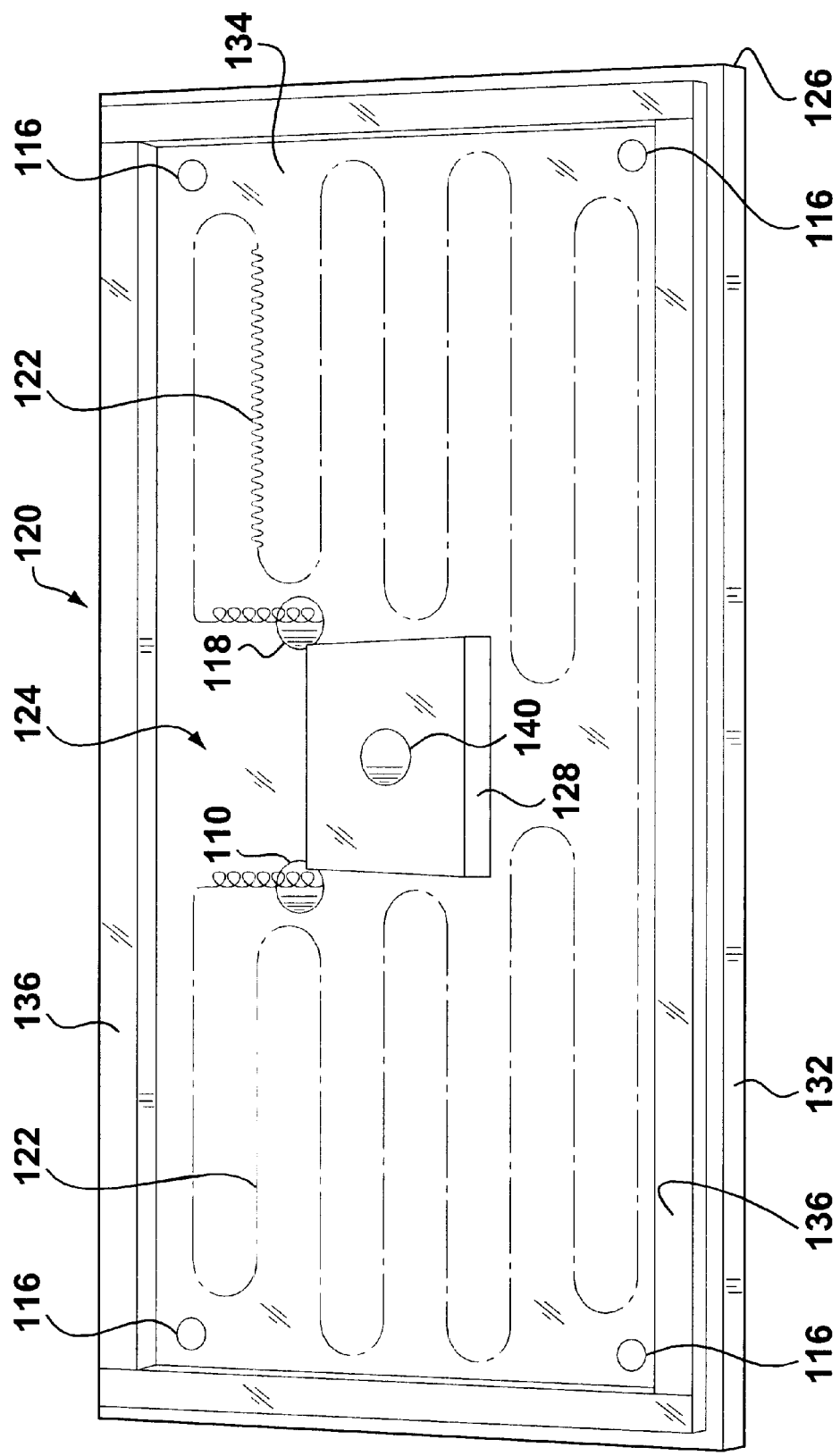
FIG. 5 is a perspective view of one embodiment of a modular heating unit of the present invention.
Figure 6:
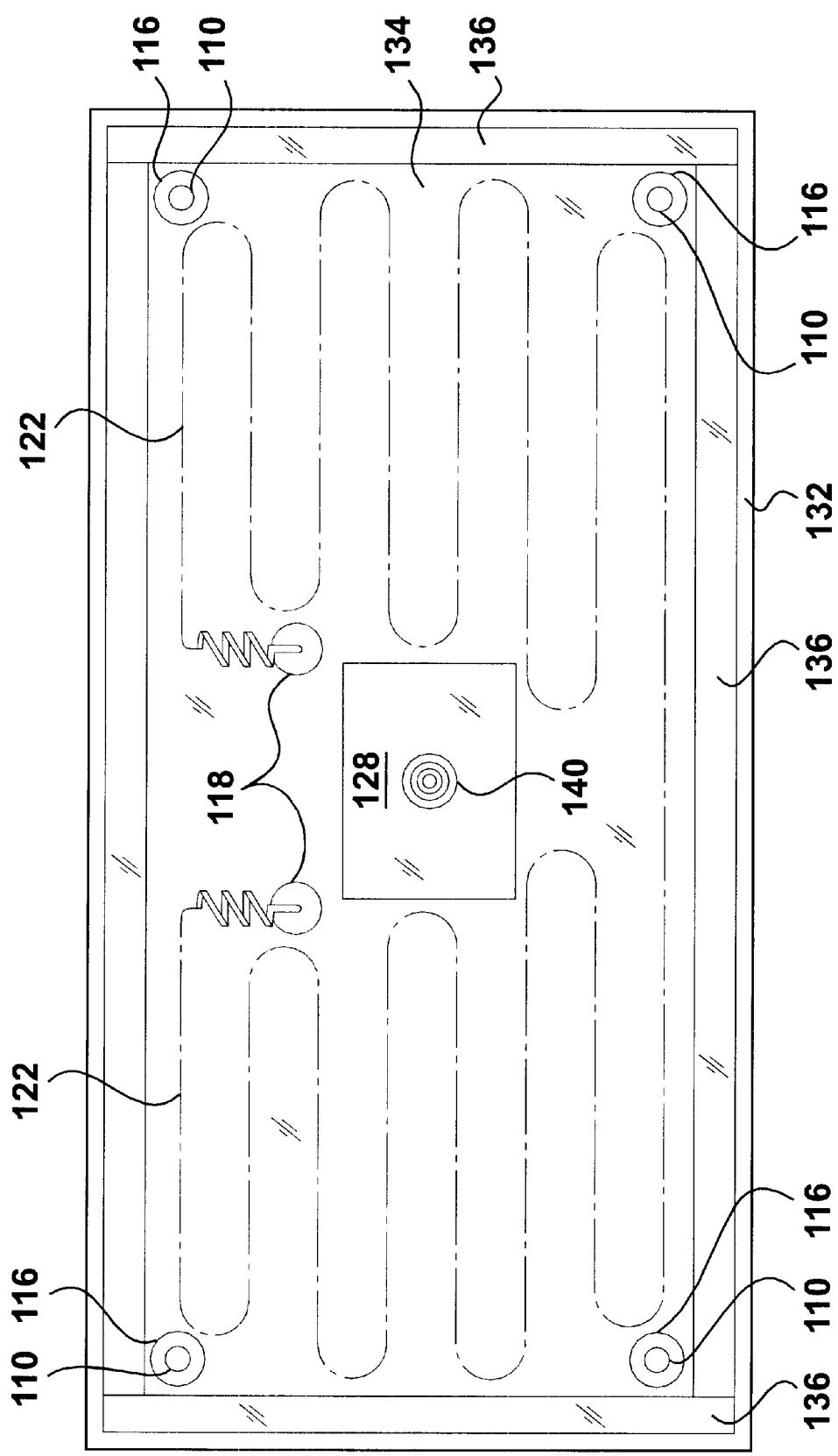
FIG. 6 is a top view of one embodiment of a modular heating unit of the present invention.

Referring to FIGS. 5 and 6, each heating unit 120 comprises of a heating element 122, an insulation layer 124, a pan 126, and a sensor shielding element or block 128. In the embodiment shown in these figures, the heating unit 120 is rectangular when viewed in plan. In this embodiment, the heating units 120 are arranged in a side-by-side relationship with the longer sections of each unit extending lengthwise of the grill 100. FIG. 3 shows six heating units 120 arranged beneath the grill plate 102. Thus, in one embodiment, the six heating units 120 comprise of two-three unit installations, one on each side of the grill 100. Each heating unit 120 is separately installed so if a unit needs to be replaced, it can be replaced without having to disconnect or remove other heating units. Further, each heating unit 120 is self-contained. As such, removal and replacement of any heating unit 120 does not require disassembly and subsequent re-assembly of the grill 100.

For one embodiment, the pan 126 of the heating unit 120 is rectangular in shape. The pan 126 has a generally flat base 130 and a circumferential sidewall 132. An insulation layer 124 is sized to fit in the pan 126. In one embodiment, the insulation layer 124 may comprise of a cake base 134 and circumferential sidewalls 136. The cake base 134 rests on the flat base 130 of the pan 126. The insulation sidewalls 136 rest against the inside portion of the sidewall 132 of the pan 126. Suitable insulation materials for the insulation layer 124 include Wacker WDS® Thermal Insulation from Wacker Silicones Corp. in Adrian, Mich. and RPC2100 from Thermal Ceramics in Augusta, Ga. The present invention is not limited to these types of insulation materials and a variety of other insulation materials known in the art may be used. In one embodiment, the cake base 134 is made of Wacker WDS® and the insulation sidewalls 136 are made of RPC2100.

In the preferred embodiment, the insulation sidewalls 136 extend higher than the pan sidewalls 132. This allows the insulation sidewalls 136 to touch the bottom surface 108 of the grill plate 102 and create a seal for a heating cavity C of the heating unit 120. The heating cavity C is defined by the insulation sidewalls 136 in the horizontal direction, and the cake base 134 and the bottom surface 108 of the grill plate 102 in the vertical direction. Having the insulation sidewalls 136 higher than the pan sidewalls 132 also prevents the pan 126 from reaching excessive temperatures.

The heating element 122 is supported on the cake base 134. The heating element 122 can be a coil or a ribbon type heating element. Both types of radiant heating elements are well-known in the art. As shown in FIGS. 5 and 6, the radiant heating element 122 is laid out in a serpentine or sinuous pattern on the insulating cake base 134. The pattern shown in FIGS. 5 and 6 is illustrative only, and the heating element may be laid out in other patterns without departing from the scope of the invention. In one embodiment, as shown in FIGS. 5 and 6, the contour of the radiant heating element 122 is designed to provide a uniform heat distribution along the cavity C.

Figure 7A:
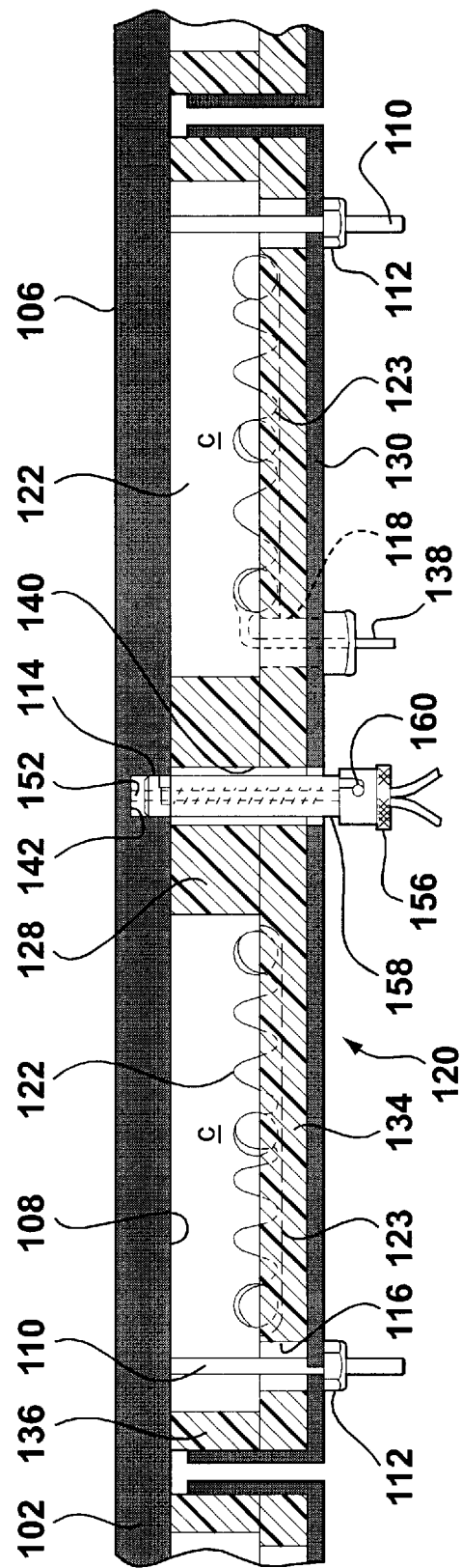
FIGS. 7A and 7B are sectional views of two embodiments of the modular heating units for the grill.
Figure 7B:
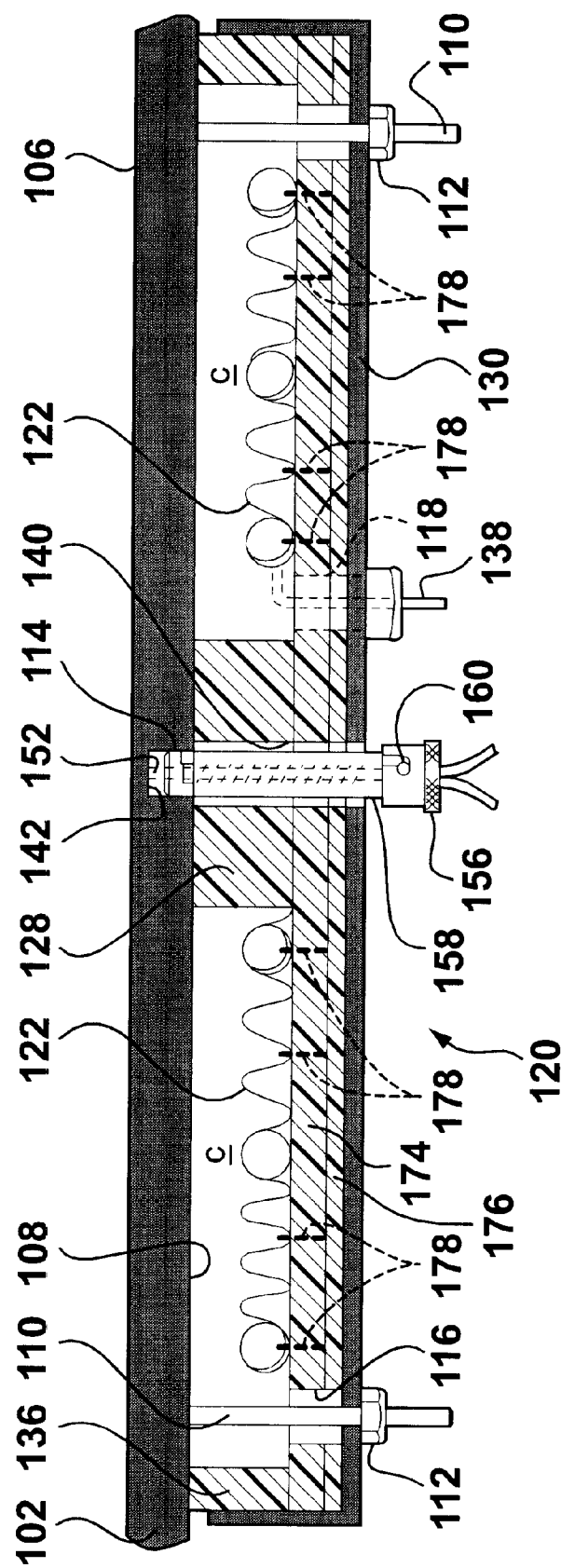

FIGS. 7A and 7B illustrate cross-sectional views of two embodiments of a heating unit 120. In the embodiment shown in FIG. 7A, the heating element 122 may be held into position by placing the heating element 122 into grooves 123 carved into the cake base 134. In another embodiment as shown in FIG. 7B, the heater element 122 may be held into position by a plurality of staples 178. If staples 178 are used, it is preferred that the staples extend through the cake base 174. The ends of the staples 178 that pass through the cake base 174 are then crimped or rolled on the bottom side of the cake base 174. Crimping or rolling the staples 178 on the bottom side of the cake base 174 prevents the staples from coming loose during heating operations of the heating unit 120. The staples 178, however, should not make contact with the metal pan 126. To prevent the staples 179 from touching the metal pan 126, a second insulation layer or blanket 176 is installed between the cake base 174 and the pan 126. One suitable material for the second insulation layer 176 is K-Shield BF Paper from Thermal Ceramics in Augusta, Ga. although other types of insulation materials may be used. What is important is that there is insulation material between the ends of the staples 178 and the metal pan 126.

As shown in FIGS. 7A and 7B, the ends of the radiant heating element 122 extend through holes 118 and terminate in an electrical connector 138 mounted to the bottom of the pan base 130. The electrical connector 138 matingly connects with a second electrical connector (not shown) on the underside of the heating unit 120 for ease of installation and removal of heating unit 120.

The heating unit 120 also includes a temperature sensor shielding element or block 128. The shielding block 128 is used to protect a temperature sensor 152 that extends through the shielding block 128. The shielding block 128 also enables the temperature sensor 152 to provide a more accurate reading of the temperature of the grill plate 102. Accordingly, the shielding block 128 has a hole 140 to accommodate the temperature sensor 152. As will be explained in more detail below, the temperature sensor extends through the hole 140 in the shielding block 128 and touches the grill plate 102. The shielding block 128 may be attached to the cake base 134 by staples or by a thermally suitable adhesive.

The shielding block 128 may be a variety of shapes including square or tubular. The embodiment shown in FIGS. 5 and 6 illustrates a square shielding block 128. The height of the shielding block 128 is preferably the distance between the bottom surface 108 of the grill plate 102 and the top surface of the insulation cake base 134. Moreover, the shielding block 128 is preferably made of a thermally insulating material similar to the material used for the cake base 134 or the insulation sidewalls 136. Suitable insulating materials include Wacker WDS® Thermal Insulation from Wacker Silicones Corp. in Adrian, Mich. and RPC2100 from Thermal Ceramics in Augusta, Ga.

A temperature sensor 152 is installed in the heating unit 120 as illustrated in FIGS. 7A and 7B. A variety of temperature sensors may be used including without limitation a thermocouple or RTD probe. In one embodiment, the temperature sensor is part of a bayonet type RTD probe assembly that may be obtained from Omega Engineering, Inc. in Stamford, Conn.

Figure 8:
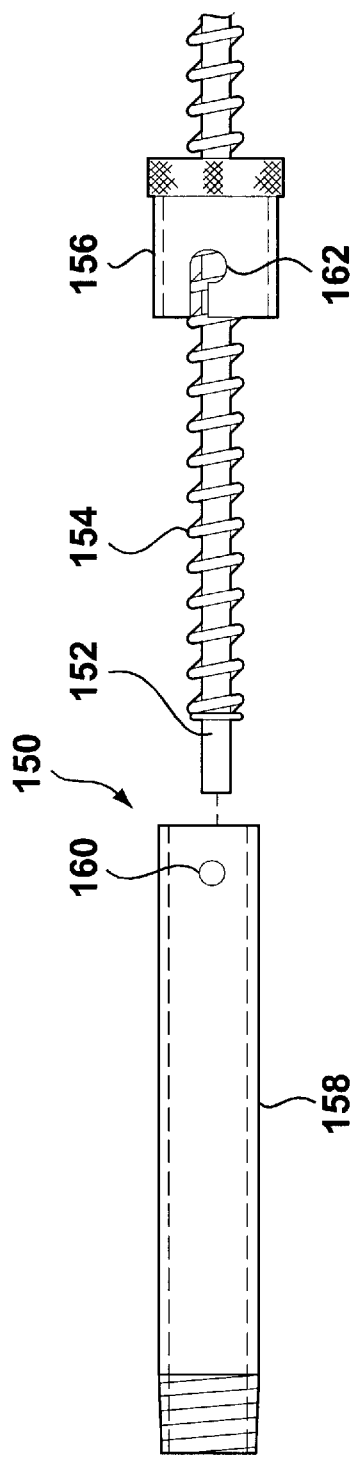
FIG. 8 is a side view of temperature probe assembly that may be used for the present invention.

FIG. 8 shows one type of a bayonet type RTD probe assembly 150. The RTD probe assembly 150 has a temperature sensor 152, a flexible armor cable 154, a locking knob 156, and a support tube 158. In one embodiment, the bore 114 in grill plate 102 is threaded. The support tube 158 is screwed into the threaded bore 114. The temperature sensor 152 and cable 154 are inserted into the support tube 158 until the tip of the temperature sensor 152 touches the bottom surface 142 of the bore 114. Once the temperature sensor 152 touches the bottom surface 142, the temperature sensor 152 is locked into position by turning the locking knob 156. The locking knob 156 has a slot 162 that receives a locking pin 160 located on the support tube 158. This holds the temperature sensor 152 in place against the bottom surface 142 of the bore 114. The flexible cable allows the temperature sensor 152 to keep in continuous contact with the bottom surface 142 of the bore 114 during various temperature variations that will occur to the grill plate 102.

A temperature control system (not shown) is electrically connected to the temperature sensor 152 and the heating element 122. The temperature control system receives the temperature read by the temperature sensor 152 and controls the power to the heating element 122. A variety of temperature control means may be employed as known to those of ordinary skill in the art.

In FIGS. 7A and 7B it can be seen that the height of the insulation sidewalls 136 form a cavity C defined by the space between the opposed sidewalls 136, and the space between the bottom 108 of the grill plate 102 and the top surface of the cake base 134/174. The heating element of the present invention is not in direct contact with the grill plate; but rather, uses radiant energy to heat the grill plate. Additionally, radiant energy heats cavity C allowing the heat distribution to be more uniform across the heating unit 120. For the number of heating units 120 employed, the temperature to which the respective cavities are heated by the respective heating elements is more uniform across the length of the grill. Unlike prior art grill constructions where heat distribution was non-uniform, the temperature of cavity C is constant across the cavity. As a result, the underside 108 of the grill plate 102 is more uniformly heated to the same temperature. In addition to providing a more uniform heat distribution, the heating unit 120 of the present invention has been found to heat the grill plate 102 to a desired food cooking temperature substantially quicker than is possible with the prior art units.

In an alternative embodiment, a second temperature sensor (not shown) may be used to monitor the temperature within cavity C. Such a temperature sensor may be responsive to the temperature within cavity C exceeding a predetermined temperature to open the electrical circuit through radiant heating element 110 so as not to damage the heating element.

Although the design and layout of the heater element 122 in FIGS. 5 and 6 provides a more uniform heat distribution across the grill plate 102 than prior art grills, it may be desirable in situations to modify the layout of the heater element to provide alternative heat distributions. For example, as shown in FIG. 3, a section adjacent to each outer side edge 144 of the grill plate 102 may extend beyond the heating unit 120 and be exposed to the ambient environment. This may result in sections adjacent to the outer side edges 144 to be slightly lower in temperature than other portions of the grill plate 102 directly above cavity C. In the industrial food cooking industry, it is important to maximize the surface area of cooking for the grill plate 102. Thus, in an alternative embodiment, the layout of the heater element 122 is modified to compensate for sections of the grill plate 102 that may extend beyond the cavity C of the heating unit 120.

Figure 9:
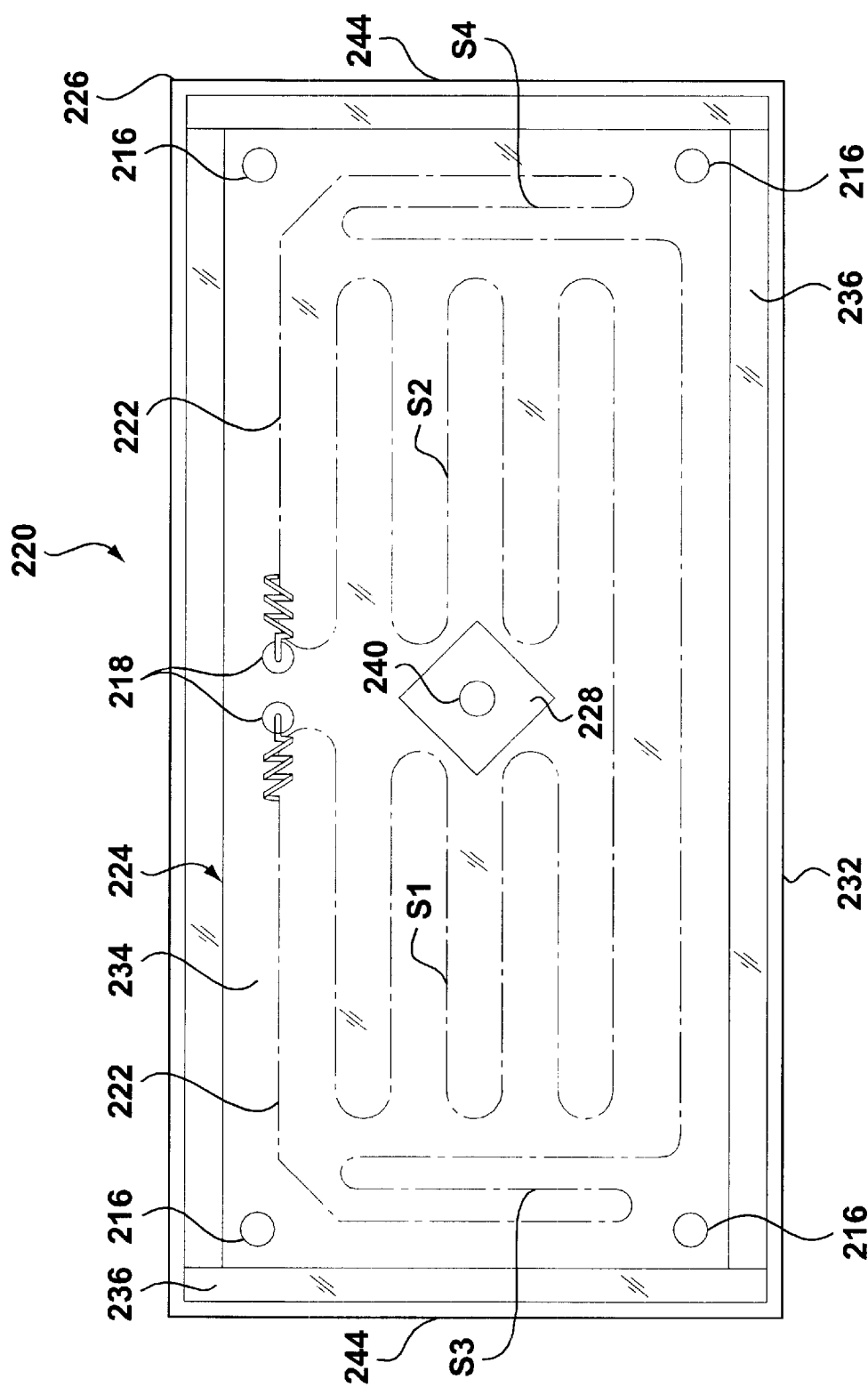
FIG. 9 is a top view of another embodiment of a modular heating unit of the present invention.

One such alternative embodiment is shown in FIG. 9 as heater unit 220. Like the heater unit 120 described above, the heating unit 220 comprises of a heating element 222, an insulation layer 224, a pan 226, and a sensor shielding element or block 228. The heating unit 220 is rectangular when viewed in plan and, when coupled to other heating units 220, is arranged in a side-by-side relationship with the longer sections of each unit extending lengthwise of the grill 100. Each heating unit 220 is separately installed so if a unit needs to be replaced, it can be replaced without having to disconnect or remove other heating units. The pan 226 has a generally flat base, and a circumferential sidewall 232. The insulation layer 224 is sized to fit in the pan 226. In one embodiment, the insulation layer 224 includes a cake base 234 that rests on the flat base of the pan 226. The cake 224 may also have a circumferential sidewall 236 that rests against the inside portion of the sidewall 232 of the pan 226.

Like the embodiment shown in FIGS. 5 and 6, the heating element 222 is supported on the cake base 234 and can be a coil or a ribbon type heating element. As shown in FIG. 9, however, the radiant heating element 222 is laid out in a serpentine or sinuous pattern with a greater percentage of the heating element 222 weighted toward the outer side edges 244 of the heater unit 220. In the embodiment shown in FIG. 9, the heating element 222 is contoured to have two main serpentine sections S1 and S2 that extend generally horizontally in a center section of the heating unit 220. The heating element 222 has two additional serpentine sections S3 and S4 in the outer edge regions of the heating unit 220. The serpentine sections S1 and S2 of the heating element 222 run in a direction perpendicular to the direction of serpentine sections S3 and S4. Serpentine sections S3 and S4 of the heating element 222 enable additional heat to be provided to the sections of the grill plate 102 adjacent the outer edges 144. It also allows additional heat to be provided to a center section of the grill plate 102 that is not directly above cavity C.

The design in FIG. 9 increases the surface area of cooking on the grill plate 102. The pattern shown in FIG. 9 is illustrative only, and the heating element may be laid out in other patterns without departing from the scope of the invention. What is important is that the pattern is weighted more toward the side edges 244 of the heater unit 220 to provide more heat to the sections of the grill plate 102 that extend beyond the cavity C.

The temperature sensor shielding block 228 should be positioned to avoid contacting the heating element 222. Thus, as shown in FIG. 9, the shielding block 228 was rotated from its original position shown in FIG. 5. This was necessary to accommodate the new layout of the heating element 222.

Figure 10:
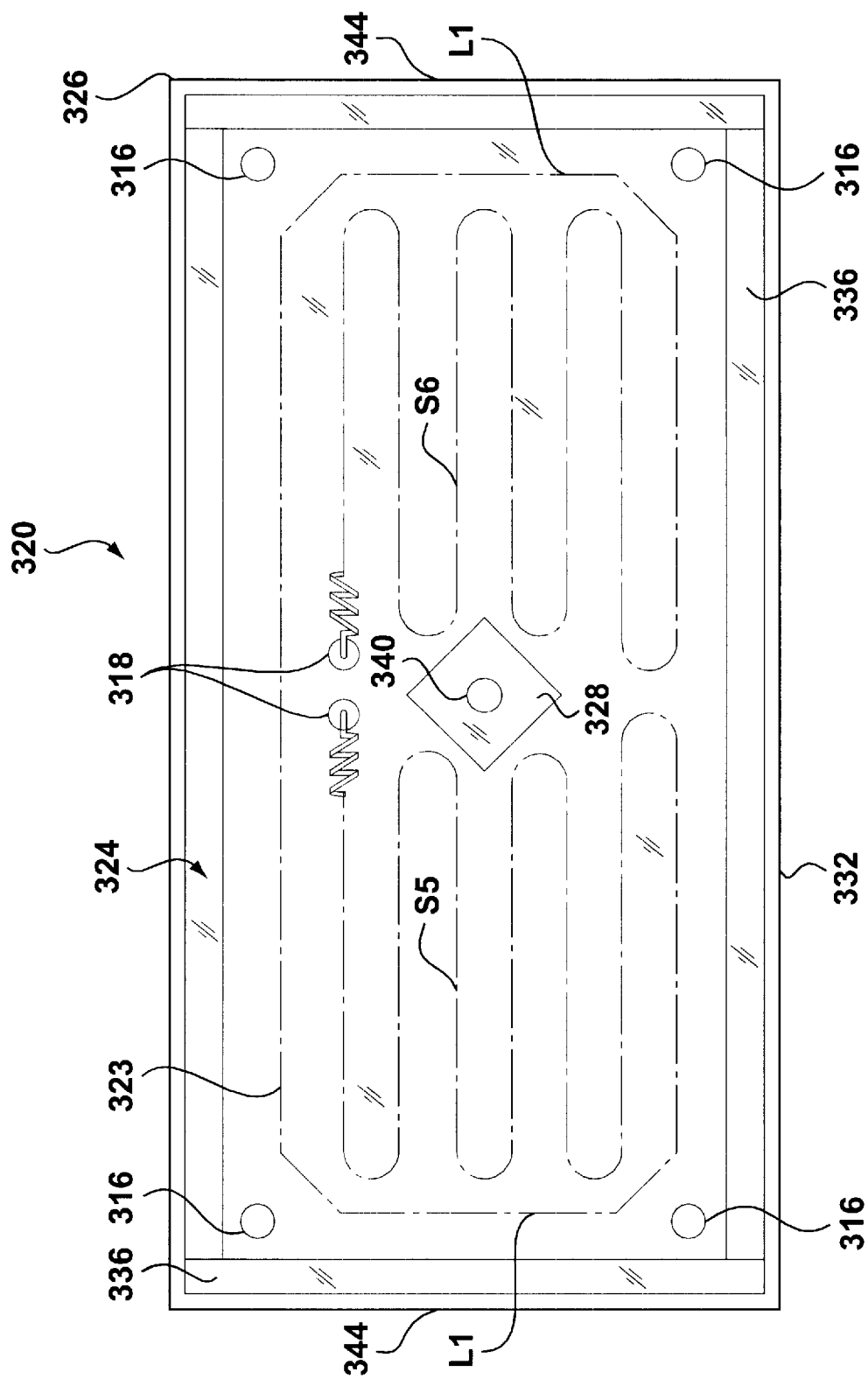
FIG. 10 is a top view of a further embodiment of a modular heating unit of the present invention.

Another alternative embodiment is shown in FIG. 10 as heater unit 320. The heating unit 320 comprises of a heating element 322, an insulation layer 324, a pan 326, and a sensor shielding element or block 328. The heating unit 320 is also rectangular when viewed in plan and, when used with additional heating units 320, are arranged in a side-by-side relationship with the longer sections of each unit extending lengthwise of the grill 100. Each heating unit 320 is self-contained. As such, removal and replacement of any heating unit 320 does not require disassembly and subsequent re-assembly of the grill 100.

The heating element 322 is supported on a cake base 334 of the insulation layer 324 and can be a coil or a ribbon type heating element. As shown in FIG. 10, however, the radiant heating element 322 is laid out in a serpentine or sinuous pattern with a greater weight toward the edges 344 of the heater unit 320. In the embodiment shown in FIG. 10, the heating element 322 is contoured to have two main serpentine sections S5 and S6 that extend generally horizontally in a center region of the heating unit 320. The heating element 322 has an additional longitudinal section L1 that runs along the outer edge regions of the heating unit 220. The longitudinal section L1 enables additional heat to be provided to the sections of the grill plate 102 adjacent the outer edges 144. It also allows additional heat to be provided to a center section of the grill plate 102 that is not directly above cavity C. The temperature sensor shielding block 428 was positioned to avoid contacting the heating element 422.

Figure 11:
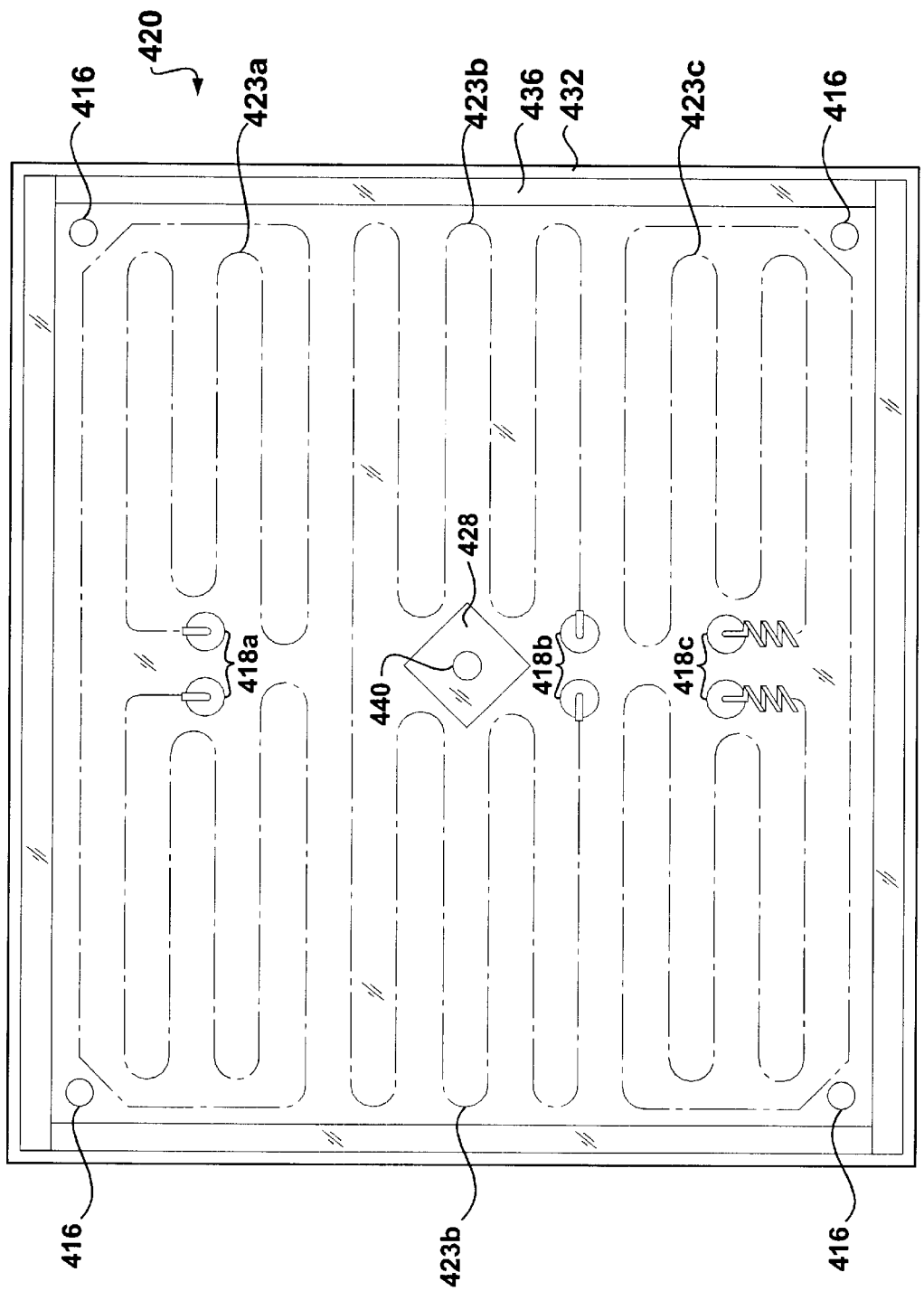
FIG. 11 is a top view of yet another embodiment of a modular heating unit of the present invention.

Another alternative embodiment is shown in FIG. 11 as heater unit 420. The heating unit 420 comprises of heating elements (422a, 422b, 422c), an insulation layer 424, a pan 426, and a sensor shielding element or block 428. The heating unit 420 in this embodiment, however, is larger than the earlier embodiments and is generally square when viewed in plan. The heating unit 420 is sized to replace three of the heating units discussed above. Thus, in one embodiment, the grill 100 supports two heating units 420 in a side-by-side configuration. Each heating unit 420 is separately installed so if a unit needs to be replaced, it can be replaced without having to disconnect or remove other heating unit. Further, each heating unit 420 is self-contained. As such, removal and replacement of any heating unit 420 does not require disassembly and subsequent re-assembly of the grill 100.

The pan 426 has a generally flat base, and a circumferential sidewall 432. The insulation layer 424 is sized to fit in the pan 426. The insulation layer 424 may have a cake base 434 that rests on the flat base of the pan 426. The insulation layer 424 may also have a circumferential sidewall 436 that rests against the inside portion of the sidewall 432 of the pan 426. As discussed above, it is preferred that the insulation sidewalls 436 extend higher than the pan sidewall 432 to create a heating cavity. This also prevents the pan 426 from overheating by touching the bottom surface 108 of the grill plate 102.

The heating unit 420 has three heating elements 422a, 422b and 422c. Like the earlier embodiment, the heating elements are supported on the cake base 434. The heating elements can be coil or ribbon type. The radiant heating elements are laid out in a serpentine or sinuous pattern to provide a more uniform temperature distribution to grill plate 102.

Besides a more uniform temperature distribution, another advantage of the present invention is the modular design of the heating units 120, 220, 320 and 420. This allows an operator the ability to replace a failed heating unit without disassembly of the entire grill as was known for prior art assemblies. Accordingly, the installation and removal of a heating unit may be accomplished with a small number of steps.

For the embodiment shown in FIGS. 3–8, to install a heating unit 120 on the bottom side 108 of the grill plate 102: First, the heating unit 120 is positioned such that a plurality of holes 116 in the heating unit 120 receive the plurality of bolts 110 located on the bottom side 108 of the grill plate 102. In the embodiment shown in FIGS. 3 and 4, four bolts 110 are used for each heating unit 120. Second, fasteners 112 are used to hold the heating unit 120 against the grill plate 102. Third, the temperature sensor assembly 150 is installed. In one embodiment, the support tube 158 of the sensor assembly 150 is inserted through hole 140 of the sensor shielding block 128 and screwed into bore 114. The temperature sensor 152 and cable 154 then slide through the support tube 158 until the temperature sensor 152 touches the bottom surface 142 of the bore 114. The locking knob 156 is turned such that the slot 162 receives the locking pin 160 on the support tube 158. Fourth, the electrical connectors 138 for the heating element 122 are connected with mating electrical connectors for the temperature control system (not shown).

To remove a heating unit 120 from the bottom side 108 of the grill plate 102: First, the electrical connectors 138 for the heating element 122 are disconnected from mating electrical connectors for the temperature control system (not shown). Second, the temperature sensor 152 is removed by turning the locking knob 156 such that the locking pin 160 slides out from slot 162. The support tube 158 may also be removed by unscrewing the tube 158 from the bore 114. Third, the fasteners 112 are removed from the bolts 110. Fourth, the heating unit 120 is lifted off of the bolts 110.

The present invention is not limited to the number of steps or the order of steps outlined above. A person skilled in the art, having the benefit of this specification, may realize a different number or sequence of steps. For example, in removing the heating unit 120 from the bottom side 108 of the grill plate 102, steps one and two may be switched. What is important, however, is making the installation and removal easier.

What has been described is a grill usable both domestically, and in commercial food establishments, to quickly and properly cook food placed on the grill. A new heating element for use with the grill comprises a radiant heating element that enables the grill to reach cooking temperatures faster than with conventional elements, and spread heat more uniformly over the cooking surfaces. The heating element is usable as either as new equipment or as replacement equipment. Multiple heating units are installed beneath the grill plate portion of the grill, and each unit includes a support base defining a cavity heated by the radiant heating element. The heating assembly has a simple construction so the grill requires fewer parts than is required when a conventional heating element is used. This not only reduces costs, but also maintenance time. Use of the radiant heating element allows food such as frozen hamburger patties to be rapidly brought to a desired cooking temperature regardless of where the food is placed on the grill.

In view of the foregoing, it will be seen that the several objects of the invention are achieved and other advantageous results are obtained.

As various changes could be made in the above constructions without departing from the scope of the invention, it is intended that all matter contained in the above description or shown in the accompanying drawings shall be interpreted as illustrative and not in a limiting sense.

What is claimed is:

1. A separately-installed, self-contained heating unit adapted for modular installation with other heating units beneath a bottom surface of a grill plate, the heating unit comprising:
   a pan having a generally flat base and a circumferential sidewall;
   an insulation layer having an insulation base and a circumferential sidewall; and
   a heating element supported on the insulation base to heat the grill plate, the heating element in a spaced apart relationship to the bottom surface of the grill plate;
   wherein the heating element has a contour to provide more heat at one or more edges of the heating unit, whereby a plurality of heating units may be arranged to provide a substantially uniform surface temperature in the grill plate.

2. The heating unit of claim 1, wherein the modular heating unit further includes a shielding block and a temperature sensor, the shielding block positioned between the bottom surface of the grill plate and a top surface of the insulation base of the insulation layer, the temperature sensor extending through a hole in the flat base of the pan and a hole in the shielding block, the temperature sensor measuring the temperature of the grill plate.

3. The heating unit of claim 2, wherein the temperature sensor extends into a bore on the bottom surface of the grill plate.

4. The heating unit of claim 2, wherein the temperature sensor is part of a bayonet type RTD probe assembly.

5. The heating unit of claim 1, wherein the insulation base rests on the flat base of the pan and the sidewall of the insulation layer rests against an inside portion of the sidewall of the pan.

6. The heating unit of claim 5, wherein the sidewall of the insulation layer extends higher than the sidewall of the pan.

7. The heating unit of claim 2, wherein the shielding block is made of an insulating material.

8. The heating unit of claim 1, wherein the heating unit has a plurality of holes to receive a plurality of bolts located on the bottom surface of the grill plate.

9. The heating unit of claim 1, wherein the heating element is supported on the insulation base by a plurality of staples.

10. The heating unit of claim 1, wherein the modular heating unit is rectangular and the side sections of the heating unit being adjacent to two shorter edges of the heating unit.

11. A grill for cooking food, said grill comprising:
    a grill plate having a top surface and a bottom surface; and
    a plurality of separately-installed, self-contained heating units adapted for modular installation beneath the bottom surface of the grill plate the heating units further comprising:
    a pan having a generally flat base and a circumferential sidewall;
    an insulation layer having an insulation base and a circumferential sidewall;
    a heating element supported on the insulation base in a spaced apart relationship to the bottom surface of the grill plate;
    wherein the heating element has a contour to provide more heat at one or more edges of the heating unit, whereby the plurality of heating units may be arranged to provide a substantially uniform surface temperature in the grill plate.

12. The grill of claim 11, wherein each heating unit further includes a shielding block and a temperature sensor, the shielding block positioned between the bottom surface of the grill plate and a top surface of the insulation base of the insulation layer, the temperature sensor extending through a hole in the flat base of the pan and a hole in the shielding block, the temperature sensor measuring the temperature of the grill plate.

13. The grill of claim 12, wherein the temperature sensor extends into a bore on the bottom surface of the grill plate.

14. The grill of claim 12, wherein the temperature sensor is part of a bayonet type RTD probe assembly.

15. The grill of claim 11, wherein the insulation base of each heating unit rests on the flat base of the pan and the sidewall of the insulation layer rests against an inside portion of the sidewall of the pan.

16. The grill of claim 15, wherein the sidewall of the insulation layer extends higher than the sidewall of the pan.

17. The grill of claim 12, wherein the shielding block is made of an insulating material.

18. The grill of claim 11, wherein each heating unit has a plurality of holes to receive a plurality of bolts located on the bottom surface of the grill plate.

19. The grill of claim 11, wherein the heating element for each heating unit is supported on the insulation base by a plurality of staples.

20. The grill of claim 11, wherein each heating unit is rectangular and the side sections of each heating unit being adjacent to two shorter edges of the modular heating unit.

* * * * *